(12) United States Patent
Kim et al.

(10) Patent No.: US 12,466,488 B2
(45) Date of Patent: Nov. 11, 2025

(54) VEHICLE BODY STRUCTURE

(71) Applicants: Hyundai Motor Company, Seoul (KR); Kia Corporation, Seoul (KR); HYUNDAI MOBIS CO., LTD., Seoul (KR)

(72) Inventors: Do Hoi Kim, Sejong-si (KR); Sun Ho Song, Uiwang-si (KR); Jae Young Lim, Seongnam-si (KR); Sea Cheoul Song, Ansan-si (KR); Kang Chul Lee, Seoul (KR); Tae Ou Park, Seongnam-si (KR); Jae Sup Byun, Seongnam-si (KR); Jang Ho Kim, Seoul (KR)

(73) Assignees: HYUNDAI MOTOR COMPANY, Seoul (KR); KIA CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 468 days.

(21) Appl. No.: 18/134,195

(22) Filed: Apr. 13, 2023

(65) Prior Publication Data

US 2024/0124062 A1    Apr. 18, 2024

(30) Foreign Application Priority Data

Oct. 18, 2022    (KR) .................. 10-2022-0134327

(51) Int. Cl.
*B62D 23/00* (2006.01)
*B60R 13/04* (2006.01)
(Continued)

(52) U.S. Cl.
CPC ............ *B62D 23/005* (2013.01); *B60R 13/04* (2013.01); *B62D 25/02* (2013.01); *B62D 25/04* (2013.01); *B62D 25/06* (2013.01); *B62D 27/065* (2013.01)

(58) Field of Classification Search
CPC ...... B62D 23/005; B62D 25/04; B62D 25/06; B62D 25/02; B62D 27/065; B60R 13/04
(Continued)

(56) References Cited

FOREIGN PATENT DOCUMENTS

| KR | 10-2015-0104269 A | 9/2015 |
|----|-------------------|--------|
| KR | 10-2023-0067148 A | 5/2023 |

(Continued)

OTHER PUBLICATIONS

WO99/20516 Text (Year: 1999).*

*Primary Examiner* — Dennis H Pedder
(74) *Attorney, Agent, or Firm* — Morgan, Lewis & Bockius LLP

(57) ABSTRACT

A vehicle body structure includes: a roof side assembly connecting upper ends of pillars of a vehicle body along the forward/backward direction of the vehicle body, the roof side assembly constituting an A-pillar of the vehicle body; and an outer garnish coupled to the outside of the roof side assembly, wherein the roof side assembly includes: a pipe having a closed cross-section shape and elongated in the forward/backward direction of the vehicle body so as to form a closed section; an upper reinforcement member coupled to the upper side of the pipe and elongated in the forward/backward direction of the vehicle body; a lower reinforcement member coupled to the lower side of the pipe and elongated in the forward/backward direction of the vehicle body; and an inner reinforcement member coupled to the vehicle body inner side of the pipe and elongated in the forward/backward direction of the vehicle body.

19 Claims, 24 Drawing Sheets

(51) Int. Cl.
B62D 25/02 (2006.01)
B62D 25/04 (2006.01)
B62D 25/06 (2006.01)
B62D 27/06 (2006.01)

(58) Field of Classification Search
USPC .......... 296/210, 203.01–4, 193.05, 6, 901.01
See application file for complete search history.

(56) References Cited

FOREIGN PATENT DOCUMENTS

| | | | |
|---|---|---|---|
| KR | 10-2023-0068661 A | | 5/2023 |
| WO | WO99/20516 | * | 4/1999 |

* cited by examiner

VEHICLE BODY STRUCTURE

CROSS-REFERENCE TO RELATED APPLICATION(S)

This application is based on and claims the benefit of priority under 35 U.S.C. 119 to Korean Patent Application No. 10-2022-0134327, filed on Oct. 18, 2022, in the Korean Intellectual Property Office, the disclosure of which is herein incorporated by reference in its entirety.

TECHNICAL FIELD

The present disclosure relates to a technology regarding the body structure of a vehicle.

BACKGROUND

The body of a vehicle provides spaces for accommodating passengers and loading cargo, secures safety against vehicle collisions and the like, and has a heavy influence on the vehicle exterior design.

A conventional vehicle body has A, B, and C-pillars successively disposed from the front side of the vehicle toward the rear side thereof. A space for mounting a windshield glass is formed between both A-pillars. Spaces for mounting front doors are formed between A-pillars and B-pillars. Spaces for mounting rear doors are formed between B-pillars and C-pillars. A space for mounting a rear windshield glass is formed between both C-pillars. A roof is coupled on top of the A, B, and C-pillars.

Conventional vehicle body structures regarding A, B, and C-pillars, which are all connected through welding in a press panel type, and which are subjected to a painting process after assembling the entire body in a body in white (BIW) state, are advantageous for mass production, but are disadvantageous to future mobility vehicle markets, which are directed toward multi-type small-volume production, because a large number of molds and other devices are required.

The above descriptions regarding background technologies have been made only to help understanding of the background of the present disclosure, and are not to be deemed by those skilled in the art to correspond to already-known prior arts.

SUMMARY

It is an aspect of the present disclosure to provide a vehicle body structure wherein the number of vehicle body components is reduced such that a part of the vehicle body configuration can be easily varied, thereby providing competitiveness in future mobility vehicle markets, which are directed toward multi-type small-volume production.

In accordance with an aspect of the present disclosure, a vehicle body structure includes: a roof side assembly configured to connect upper ends of pillars of a vehicle body along the forward/backward direction of the vehicle body, the roof side assembly constituting an A-pillar of the vehicle body; and an outer garnish coupled to the outer side of the roof side assembly, wherein the roof side assembly includes: a pipe having a closed cross-section shape and elongated in the forward/backward direction of the vehicle body so as to form a closed section; an upper reinforcement member coupled to the upper side of the pipe and elongated in the forward/backward direction of the vehicle body; a lower reinforcement member coupled to the lower side of the pipe and elongated in the forward/backward direction of the vehicle body; and an inner reinforcement member coupled to the vehicle body inner side of the pipe and elongated in the forward/backward direction of the vehicle body, and wherein at least one C-pillar mounting bracket is provided on the rear side of the roof side assembly so as to fix the pipe to the upper end of a C-pillar of a lower vehicle body.

The C-pillar mounting bracket may include: a main bracket coupled to the upper end of the C-pillar of the lower vehicle body while supporting the vehicle body inner side and lower side of the pipe; and a sub-bracket coupled to the main bracket while surrounding the vehicle body outer side of the pipe.

The main bracket may have a recess curved along the lower contour of the pipe such that the inner and lower surfaces of the pipe are seated in the recess.

The sub-bracket may be formed in a plate shape such that the lower side thereof is coupled to the main bracket while surrounding the outer surface of the pipe seated in the recess of the main bracket.

The roof side assembly may be coupled to the C-pillar of the lower vehicle body by multiple downward fastening bolts penetrating the upper reinforcement member from the upper side with respect to the pipe so as to be coupled to the lower vehicle body, and multiple lateral fastening bolts laterally penetrating the lower reinforcement member from the outside of the lower side with respect to the pipe so as to be coupled to the lower vehicle body.

At least one of the downward fastening bolts may successively penetrate the upper reinforcement member and one of the main bracket or the inner reinforcement member so as to be fastened to the lower vehicle body, and at least one of the lateral fastening bolts may penetrate the main bracket or the lower reinforcement member from the outside of the lower side with respect to the pipe so as to be coupled to the lower vehicle body.

The multiple downward fastening bolts may include: a first downward fastening bolt successively penetrating the upper reinforcement member and the main bracket so as to be fastened to the lower vehicle body; and a second downward fastening bolt successively penetrating the upper reinforcement member and the inner reinforcement member so as to be fastened to the lower vehicle body.

The multiple lateral fastening bolts may include: a first lateral fastening bolt penetrating the main bracket so as to be fastened to the lower vehicle body; and a second lateral fastening bolt and a third lateral fastening bolt penetrating the lower reinforcement member so as to be fastened to the lower vehicle body.

The outer garnish may have a flange formed to protrude toward the vehicle body inner side and to cover upper sides of the downward fastening bolts such that the downward fastening bolts are not exposed to the outside, while preventing moisture inflow.

The main bracket may be shaped to cover a parting line on the upper end of the C-pillar of the lower vehicle body.

An outer panel of the C-pillar of the lower vehicle body may have an upper end formed on the lower side of the main bracket such that the roof side assembly, to which the main bracket and the sub-bracket are coupled, can be moved laterally from a lateral side of the lower vehicle body toward the lower vehicle body to be coupled thereto.

In accordance with another aspect of the present disclosure, a vehicle body structure includes: a roof side assembly configured to connect upper ends of all pillars of a vehicle body along the forward/backward direction of the vehicle body, the roof side assembly constituting an A-pillar of the vehicle body; and an outer garnish coupled to the outer side of the roof side assembly, wherein the roof side assembly includes: a pipe having a closed cross-section shape and elongated in the forward/backward direction of the vehicle body so as to form a closed section; and a molding member injection-molded while the pipe is inserted therein, and wherein multiple C-pillar fastening portions are provided on the rear side of the molding member so as to couple the roof side assembly to the upper end of a C-pillar of a lower vehicle body.

The C-pillar fastening portions of the molding member may include: multiple downward fastening portions configured to receive multiple downward fastening bolts penetrating the molding member from the upper side of the vehicle body inner side with respect to the pipe so as to be coupled to the lower vehicle body; and multiple lateral fastening portions configured to receive multiple lateral fastening bolts laterally penetrating the molding member from the outside of the lower side with respect to the pipe so as to be coupled to the lower vehicle body.

The multiple downward fastening portions may include bolt head seats protruding from the upper surface of the molding member so as to support bolt heads of the downward fastening bolts.

The lateral fastening portions may include bolt receiving bosses having spaces formed at the center thereof so as to receive the lateral fastening bolts, and multiple reinforcement ribs support the bolt receiving bosses having spaces from the outside.

The lateral fastening bolts may include a first lateral fastening bolt, a second lateral fastening bolt, and a third lateral fastening bolt successively disposed from the front side of the vehicle body toward the rear side thereof, and the downward fastening bolts may include a first downward fastening bolt and a second downward fastening bolt successively disposed from the front side of the vehicle body toward the rear side thereof.

The outer garnish may have a flange formed to protrude toward the vehicle body inner side and to cover upper sides of the downward fastening bolts such that the downward fastening bolts are not exposed to the outside, while preventing moisture inflow.

An outer panel of the C-pillar of the lower vehicle body may have an upper end formed on the lower side of the molding member so as to form a predetermined assembly gap with the lower end of the molding member such that the roof side assembly can be moved laterally from a lateral side of the lower vehicle body toward the lower vehicle body to be coupled thereto.

The molding member of the roof side assembly may be coupled so as to overlap the inner panel of the C-pillar, and at least one of the lateral fastening bolts is fastened in areas in which the molding member and the inner panel of the C-pillar overlap.

The present disclosure advantageously provides a vehicle body structure wherein the number of vehicle body components is reduced such that a part of the vehicle body configuration can be easily varied, thereby providing competitiveness in future mobility vehicle markets, which are directed toward multi-type small-volume production.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
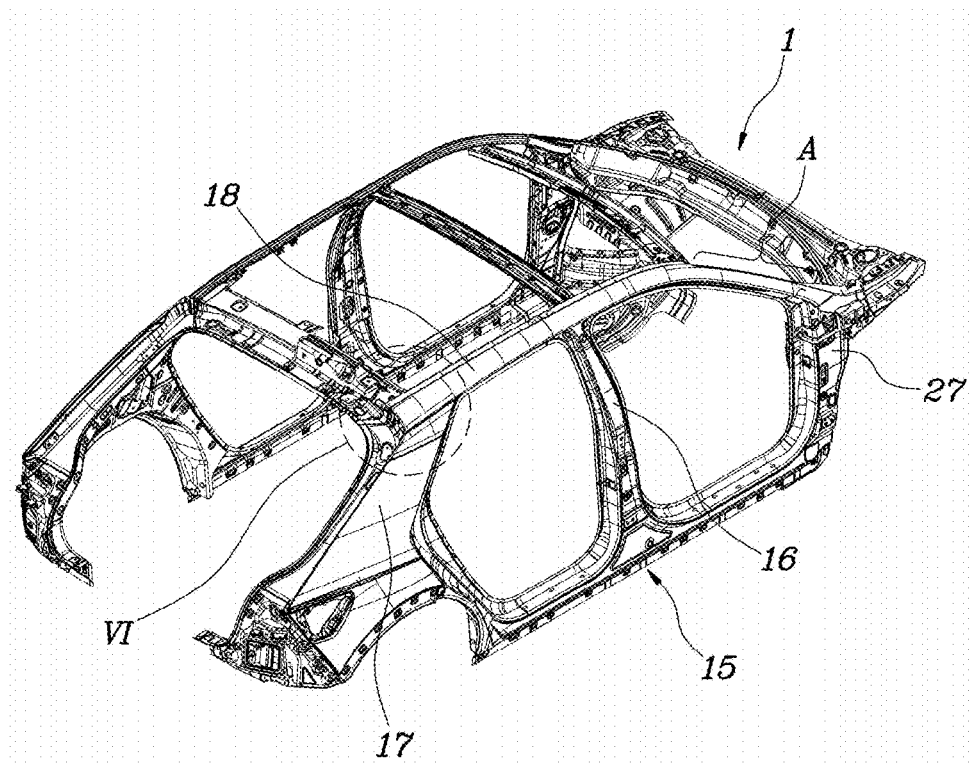
FIG. 1 illustrates a vehicle body structure according to the first embodiment of the present disclosure.
Figure 2:
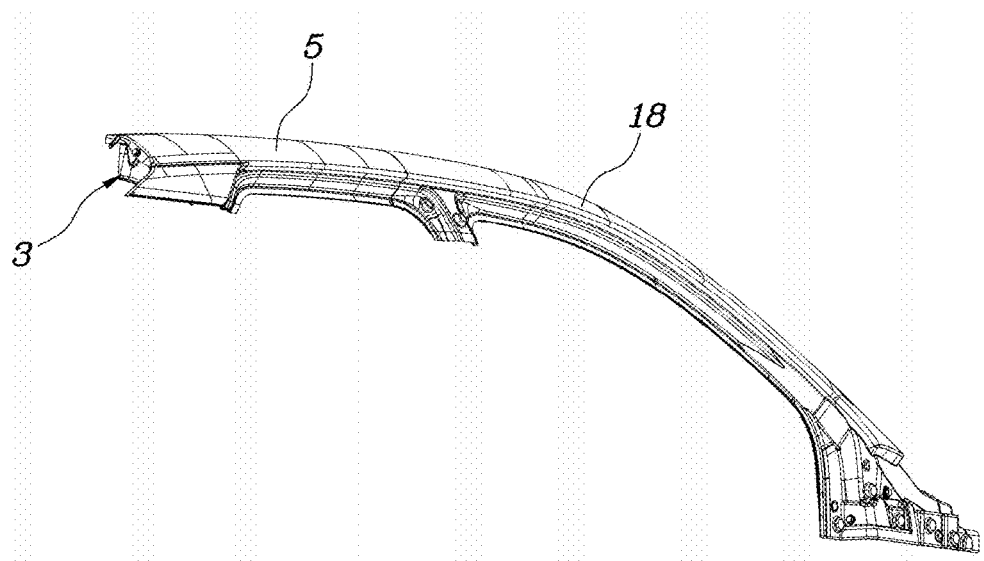
FIG. 2 illustrates the roof side assembly and the outer garnish in FIG. 1.

Hereinafter, embodiments disclosed in the present specification will be described in detail with reference to the accompanying drawings, and the same or similar elements are given the same and similar reference numerals, so duplicate descriptions thereof will be omitted.

The terms "module" and "unit" used for the elements in the following description are given or interchangeably used in consideration of only the ease of writing the specification, and do not have distinct meanings or roles by themselves.

In describing the embodiments disclosed in the present specification, when the detailed description of the relevant known technology is determined to unnecessarily obscure the gist of the present disclosure, the detailed description may be omitted. Further, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

A unit or a control unit included in names such as a motor control unit (MCU) and a hybrid control unit (HCU) is merely a term widely used for naming a controller configured to control a specific function of a vehicle, but does not mean a generic function unit.

A controller may include a communication device configured to communicate with a sensor or another control unit, a memory configured to store an operation system, a logic command, or input/output information, and at least one processor configured to perform determination, calculation, decision or the like which are required for responsible function controlling.

Referring to FIG. 1 to FIG. 13, the first embodiment of a vehicle body structure of the present disclosure includes: a roof side assembly 3 which connects upper ends of all pillars of a vehicle body 1 along the forward/backward direction of the vehicle body 1, and which constitutes the A-pillar itself; and an outer garnish 5 coupled to the outside of the roof side assembly 3. The roof side assembly 3 includes: a pipe 7 elongated in the forward/backward direction of the vehicle body while forming a closed section; an upper reinforcement member 9 coupled to the upper side of the pipe 7 and elongated in the forward/backward direction of the vehicle body; a lower reinforcement member 11 coupled to the lower side of the pipe 7 and elongated in the forward/backward direction of the vehicle body; and an inner reinforcement member 13 coupled to the pipe 7 and elongated in the forward/backward direction of the vehicle body. At least one C-pillar mounting bracket 19 is provided on the rear side of the roof side assembly 3 so as to fix the pipe 7 to the upper end of the C-pillar 17 of the lower vehicle body 15.

For reference, the vehicle body 1 in FIG. 1 may be divided into an upper vehicle body 18 and a lower vehicle body 15. The roof side assembly 3 and the outer garnish 5 may constitute the upper vehicle body 18. The underlying B-pillar 16, C-pillar 17, and the like may constitute the lower vehicle body 15. The lower vehicle body 15 may be provided as a common item, and the upper vehicle body 18 including the roof side assembly 3 and the outer garnish 5 may be tailored to the vehicle type and coupled to the upper side of the lower vehicle body 15 such that a flexible approach to future mobility vehicle markets, which are directed toward multi-type small-volume production, can be adopted.

It is also possible to modify both the structure of the lower vehicle body 15 and the roof side assembly 3 and the outer garnish 5 of the present disclosure, which constitute the upper vehicle body 18, such that a more flexible vehicle body can be configured.

The front portion of the roof side assembly 3 forms the A-pillar itself as described above, and is marked by A in FIG. 1.

In the present embodiment, the C-pillar mounting bracket 19 includes: a main bracket 21 coupled to the upper end of the C-pillar 17 of the lower vehicle body 15 so as to support the vehicle body inner side and lower side of the pipe 7; and a sub-bracket 23 coupled to the main bracket 21 so as to surround the vehicle body outer side of the pipe 7.

Figure 3:
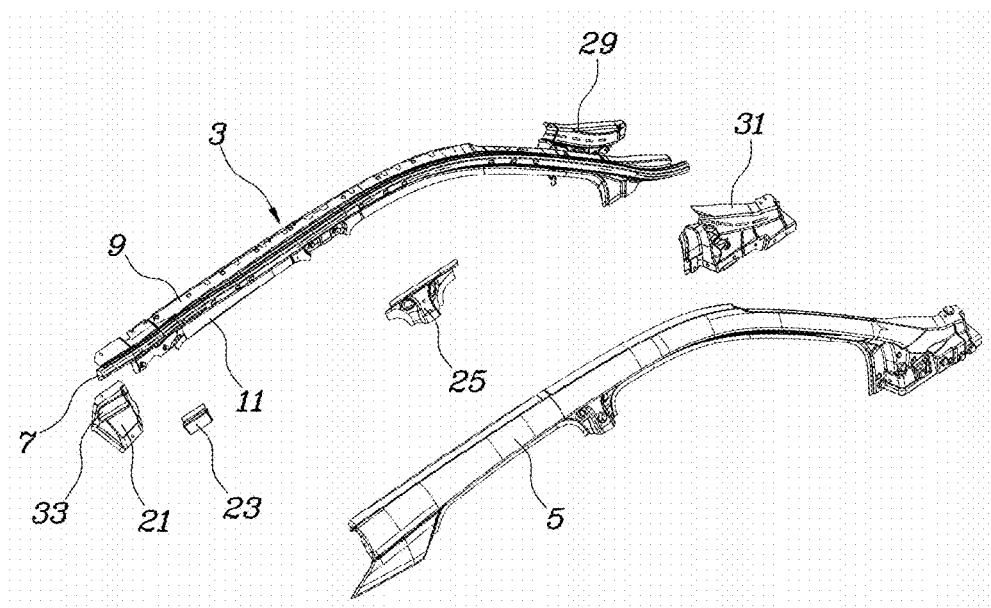
FIG. 3 is an exploded view of the roof side assembly and the outer garnish in FIG. 2.
Figure 4:
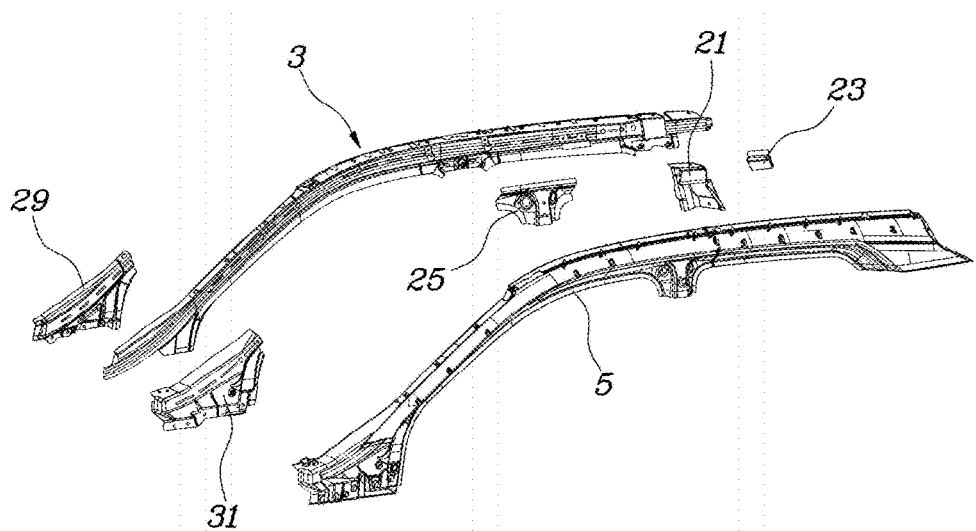
FIG. 4 is an opposite view of FIG. 3.
Figure 5:
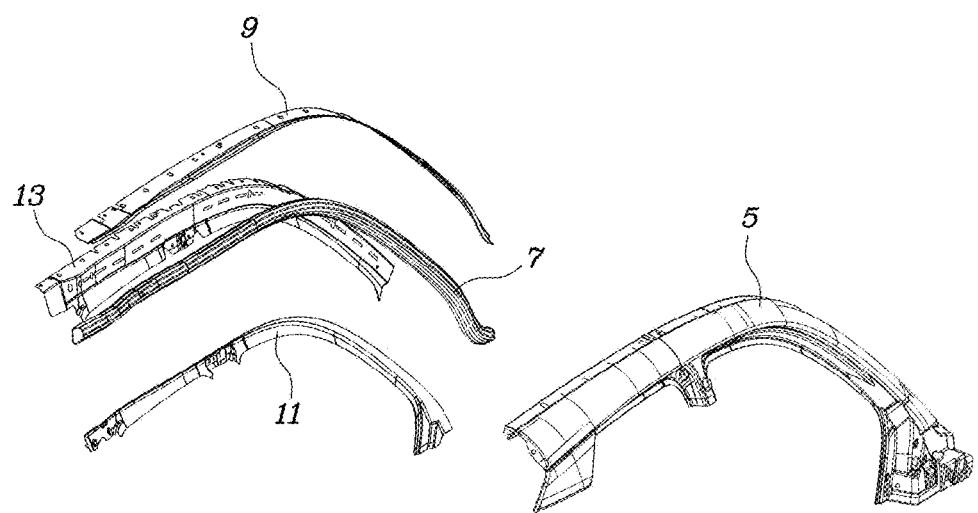
FIG. 5 is an additionally exploded view of the roof side assembly in FIG. 3.

For reference, FIG. 3 and FIG. 4 illustrate a B-pillar mounting bracket 25 for coupling the roof side assembly 3 to the upper end of the B-pillar 16, and A-pillar mounting bracket 29 for coupling the front end of the roof side assembly 3 to a fender 27, and an A-pillar reinforcement member 31 for reinforcing the front end of the roof side assembly 3.

The main bracket 21 has a recess 33 curved along the lower contour of the pipe 7 such that the inner and lower surfaces of the pipe 7 are seated in the recess 33.

The sub-bracket 23 is formed in a plate shape such that the lower side thereof is coupled to the main bracket 21 while surrounding the outer surface of the pipe 7 seated in the recess 33 of the main bracket 21.

The roof side assembly 3 is coupled to the C-pillar 17 of the lower vehicle body 15 by multiple downward fastening bolts penetrating the upper reinforcement member 9 from the upper side with respect to the pipe 7 so as to be coupled to the lower vehicle body 15, and by multiple lateral fastening bolts laterally penetrating the lower reinforcement member 11 from the outside of the lower side with respect to the pipe 7 so as to be coupled to the lower vehicle body 15.

At least one of the downward fastening bolts successively penetrates the upper reinforcement member 9 and the main bracket 21 so as to be coupled to the lower vehicle body 15.

That is, in the present embodiment, the multiple downward fastening bolts include a first downward fastening bolt 35 successively penetrating the upper reinforcement member 9 and the main bracket 21 so as to be coupled to the lower vehicle body 15, and a second downward fastening bolt 37 successively penetrating the upper reinforcement member 9 and the inner reinforcement member 13 so as to be coupled to the lower vehicle body 15.

Meanwhile, the present embodiment further includes at least one lateral fastening bolt penetrating the main bracket 21 from the outside of the lower side with respect to the pipe 7 so as to be coupled to the lower vehicle body 15, in addition to the multiple lateral fastening bolts.

That is, in the present embodiment, the multiple lateral fastening bolts include a first lateral fastening bolt 39 penetrating the main bracket 21 so as to be coupled to the lower vehicle body 15, and a second lateral fastening bolt 41 and a third second lateral fastening bolt 43 penetrating the lower reinforcement member 11 so as to be coupled to the lower vehicle body 15.

As described above, in the present embodiment, the roof side assembly 3, together with the main bracket 21 and the sub-bracket 23, form a stereoscopically robust coupling structure by five bolts in the lower vehicle body 15. By being able to couple the roof side assembly 3 (upper vehicle body 18) to the upper end of the C-pillar 17 (lower vehicle body 15) by bolt fastening in this manner, it is possible to provide a vehicle body structure more appropriate for multi-type small-volume production in a smart factory.

Figure 10:
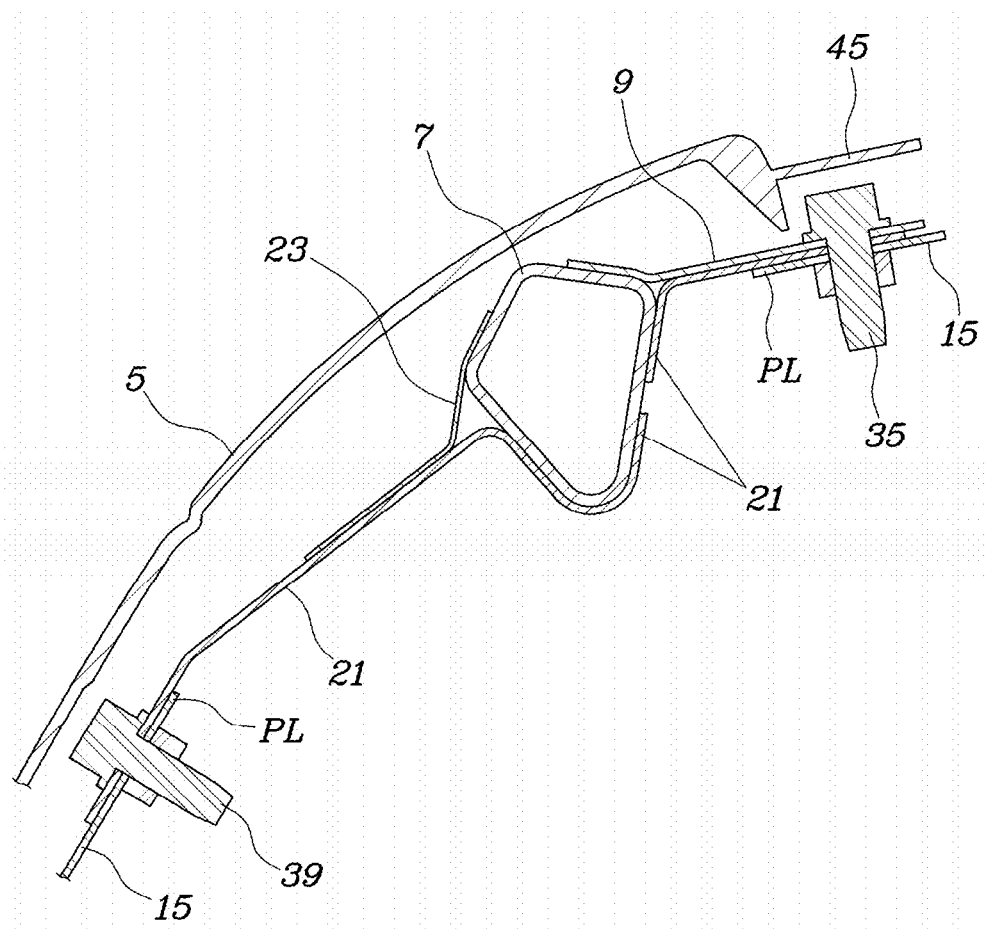
FIG. 10 is a sectional view taken along line X-X in FIG. 9.
Figure 11:
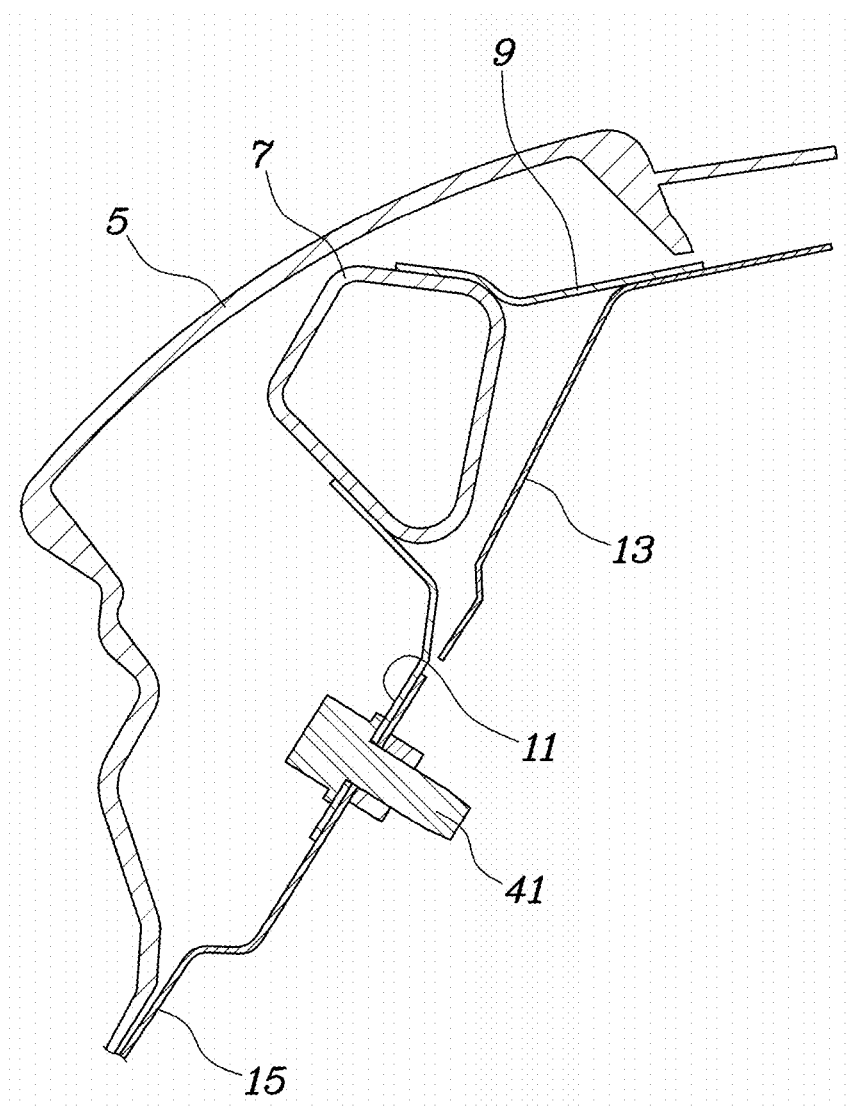
FIG. 11 is a sectional view taken along line XI-XI in FIG. 9.
Figure 12:
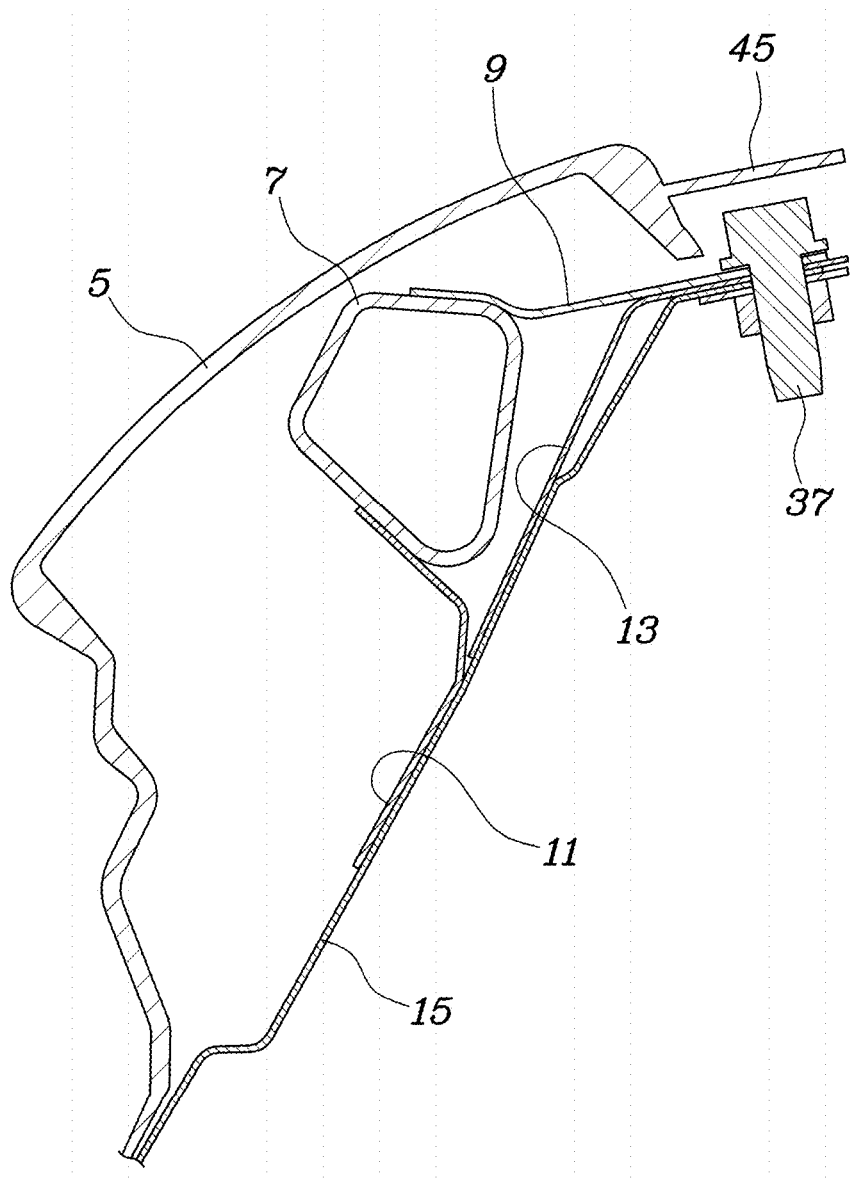
FIG. 12 is a sectional view taken along line XII-XII in FIG. 9.

Referring to sectional views of the outer garnish 5 in FIG. 10 to FIG. 12, the outer garnish 5 has a flange 45 formed to protrude from the vehicle body inner side and to cover the upper side of the downward fastening bolts such that the downward fastening bolts are not exposed to the outside, while preventing moisture inflow.

A roof panel or the like may be coupled to the flange 45 so as to firmly implement the function for preventing moisture inflow.

The main bracket 21 is shaped to cover the parting line PL on the upper end of the C-pillar 17 of the lower vehicle body 15.

That is, as illustrated in FIG. 10, the main bracket 21 covers the parting line PL between panels on the upper end of the C-pillar 17.

Figure 6:
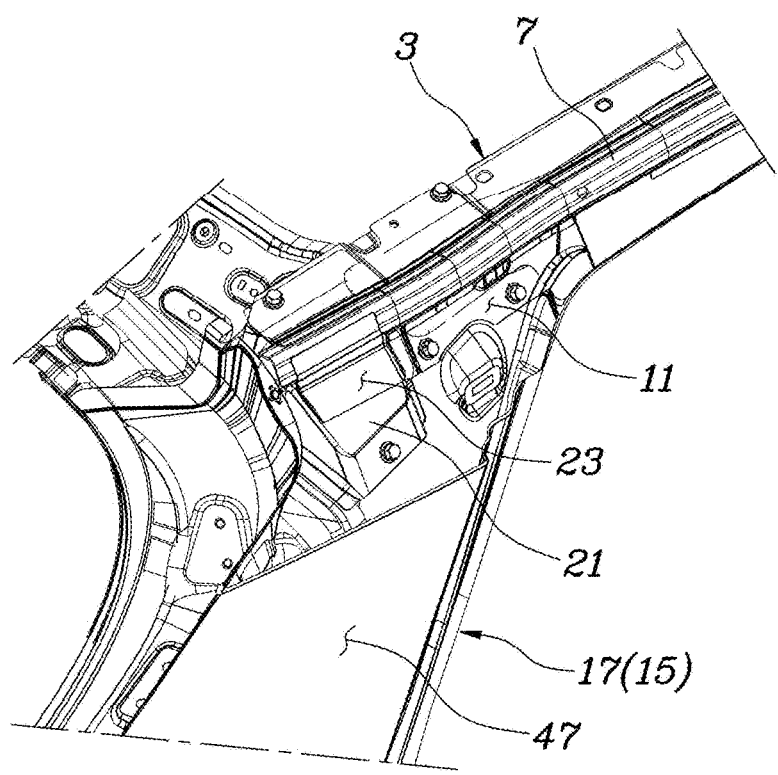
FIG. 6 is a detailed view of area VI in FIG. 1, in which the roof side assembly is coupled to the C-pillar of the lower vehicle body.
Figure 7:
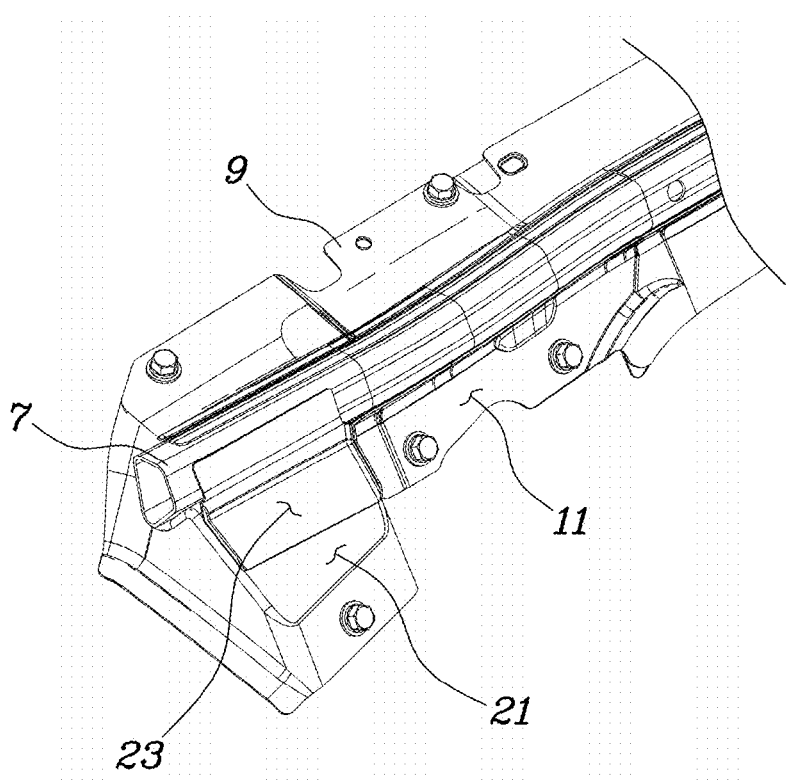
FIG. 7 is a view of FIG. 6, from which the lower vehicle body is deleted.
Figure 8:
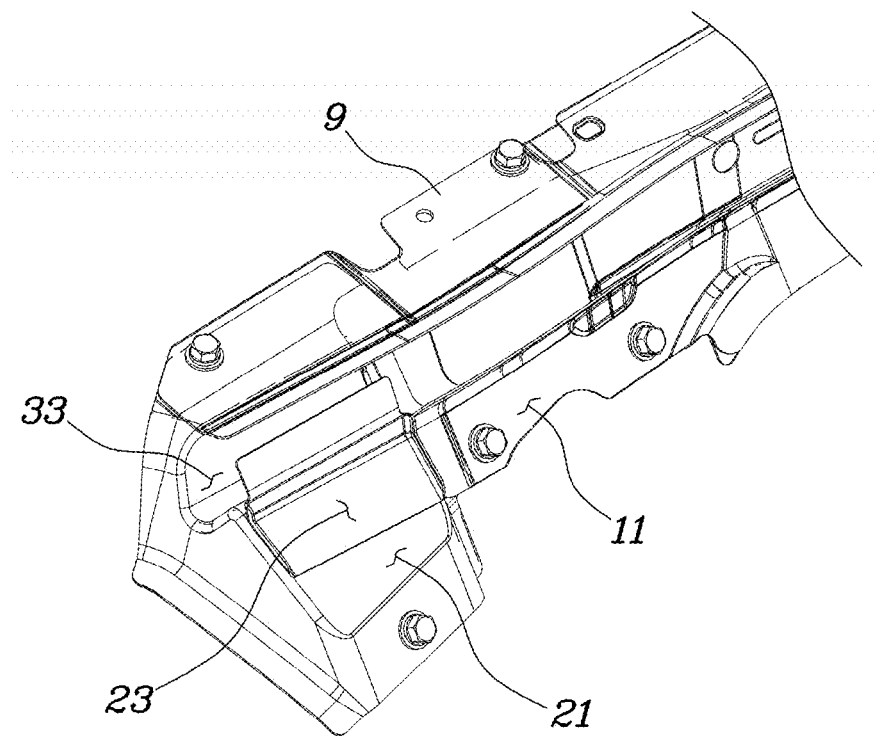
FIG. 8 is a view of FIG. 7, from which the pipe is deleted.
Figure 9:
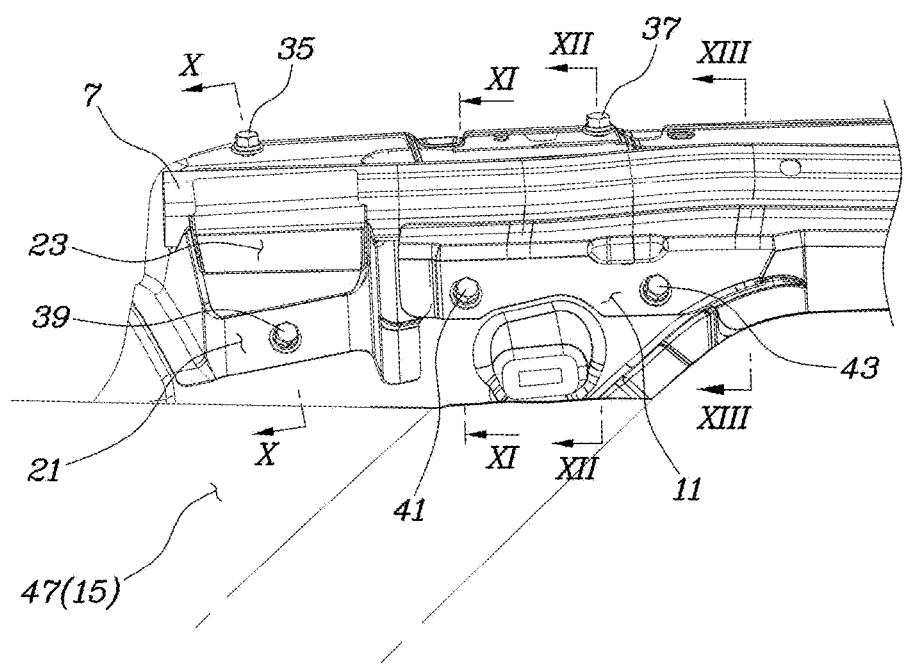
FIG. 9 illustrates a part of FIG. 6 seen from a side of the vehicle body.

Referring to FIG. 6, the outer panel 47 of the C-pillar 17 of the lower vehicle body 15 has an upper end formed on the lower side of the main bracket 21 such that the roof side assembly 3, to which the main bracket 21 and the sub-bracket 23 are coupled, can be laterally moved from a lateral side of the lower vehicle body 15 toward the lower vehicle body 15 and coupled thereto.

Figure 13:
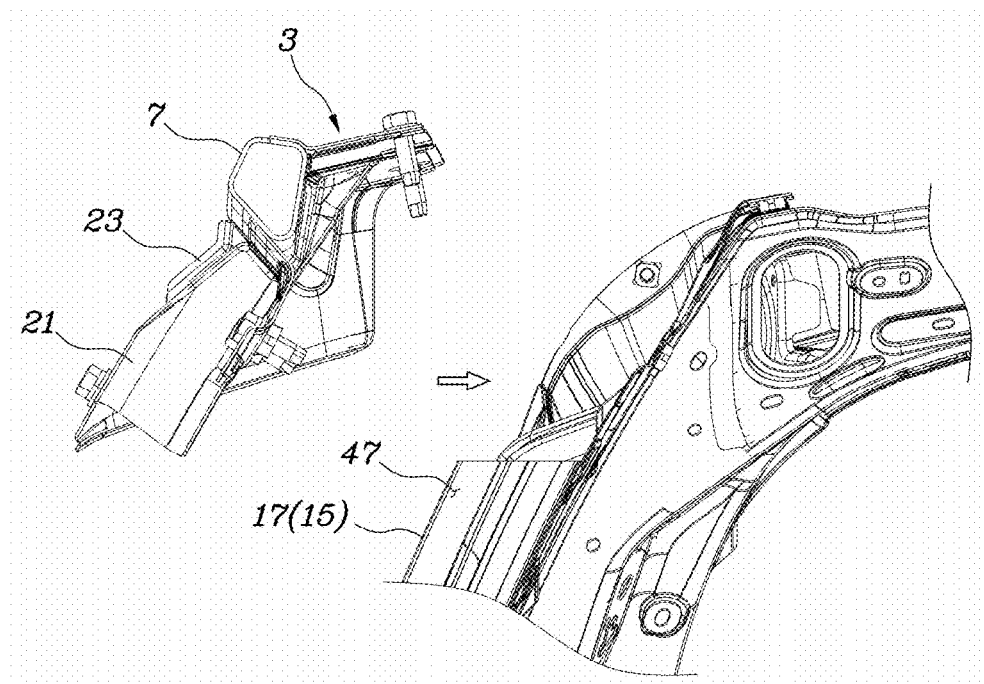
FIG. 13 is a sectional view taken along line XIII-XIII in FIG. 9, in which the roof side assembly is coupled to the lower vehicle body.

Accordingly, the roof side assembly 3, with which the main bracket 21 and the sub-bracket 23 are integrated through welding or the like, can be laterally moved from a lateral side of the lower vehicle body 15 so as to be assembled with the lower vehicle body 15 as illustrated in FIG. 13, thereby facilitating the vehicle body assembly process.

Referring to FIG. 14 to FIG. 20, the second embodiment of a vehicle body structure of the present disclosure includes: a roof side assembly 3 which connects upper ends of all pillars of a vehicle body along the forward/backward direction of the vehicle body, and which constitutes the A-pillar itself; and an outer garnish 5 coupled to the outside of the roof side assembly 3. The roof side assembly 3 includes: a pipe 7 elongated in the forward/backward direction of the vehicle body while forming a closed section; and a molding member 49 injection-molded to be inserted into the pipe 7. Multiple C-pillar fastening portions 51 are provided on the rear side of the molding member 49 in order to couple the roof side assembly 3 to the upper end of the C-pillar 17 of the lower vehicle body 15.

Figure 14:
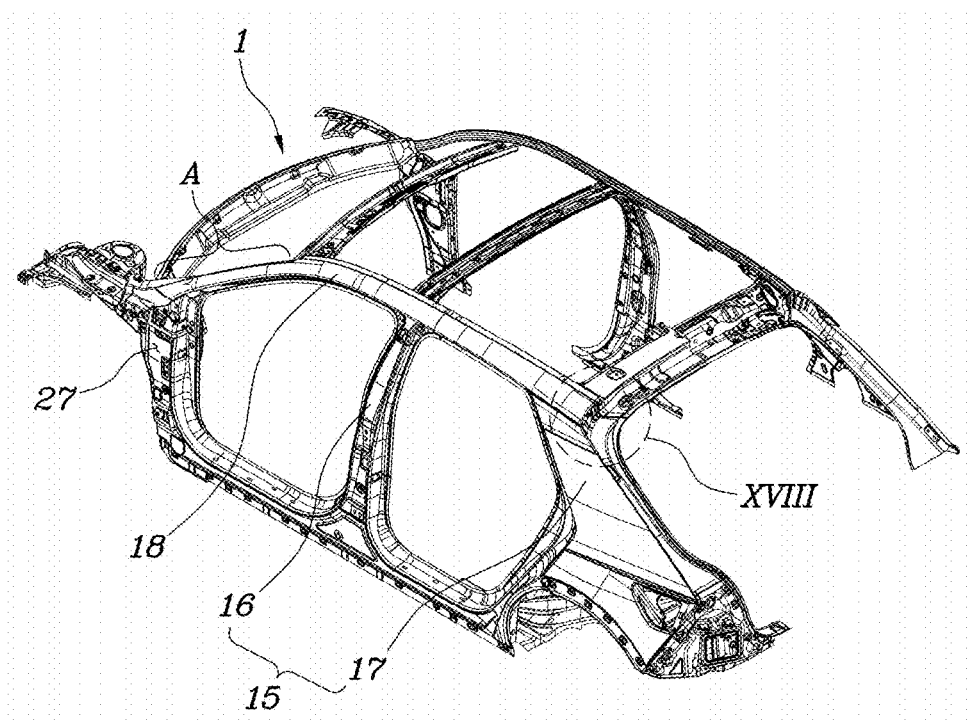
FIG. 14 illustrates a vehicle body structure according to the second embodiment of the present disclosure.
Figure 15:
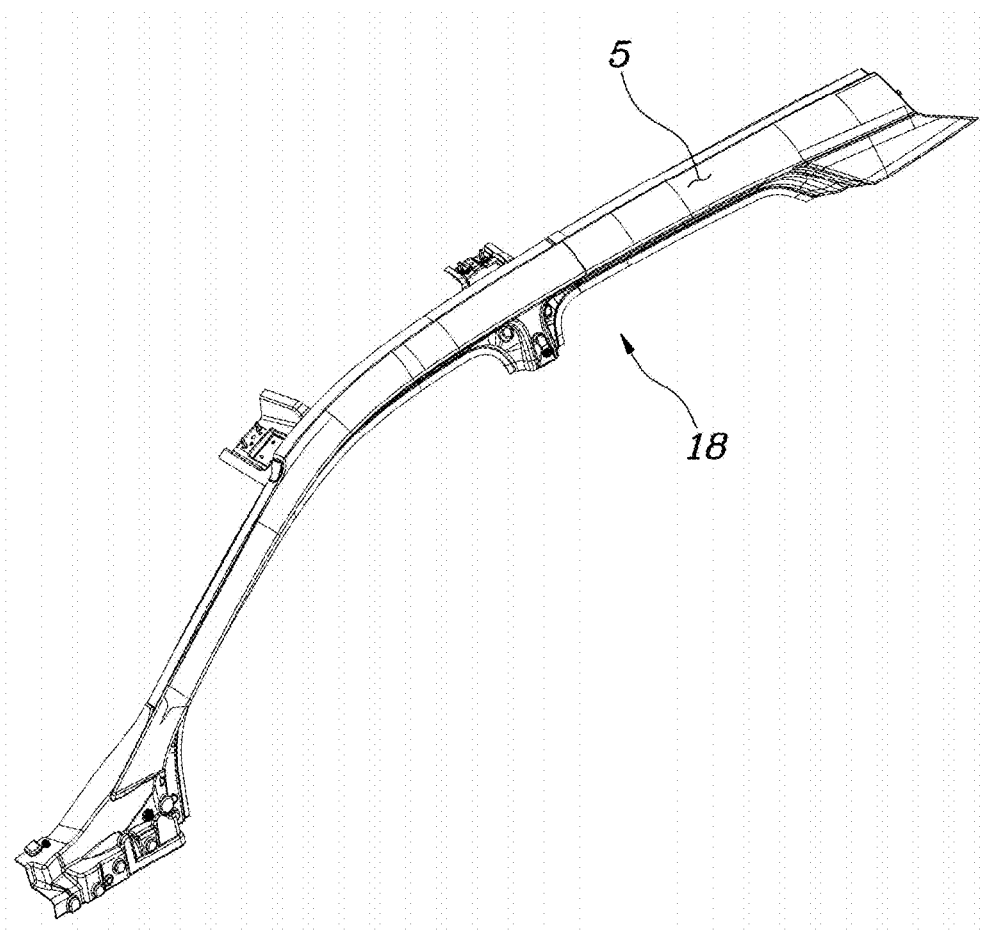
FIG. 15 illustrates the upper body, to which the roof side assembly and the outer garnish are coupled, in FIG. 14.

For reference, the vehicle body 1 in FIG. 14 may include a lower vehicle body 15 and an upper vehicle body 18, and the upper vehicle body 18 may include the roof side assembly 3 and the outer garnish 5.

For example, in connection with the vehicle body 1 in FIG. 14, the underlying B-pillar 16, C-pillar 17, and the like may constitute the lower vehicle body 15. The lower vehicle body 15 may be provided as a common item, and the upper vehicle body 18 including the roof side assembly 3 and the outer garnish 5 according to the present disclosure may be tailored to the vehicle type and coupled to the upper side of the lower vehicle body 15 such that a flexible approach to future mobility vehicle markets, which are directed toward multi-type small-volume production, can be adopted.

It is also possible to modify both the structure of the lower vehicle body 15 and the roof side assembly 3 and the outer garnish 5 of the present disclosure, which constitute the upper vehicle body 18, such that at more flexible vehicle body can be configured.

The front portion of the roof side assembly 3 forms the A-pillar itself as described above, and is marked by A in FIG. 1.

The pipe 7 is made of a metallic material so as to secure sufficient strength. Multiple nutserts 53 and multiple insert brackets 55 are mounted on the pipe 7. The molding member 49 are molded so as to expose parts on which the nutserts 53 are mounted to the vehicle body inner side and to surround the insert brackets 55.

Bolts or the like may be fastened to the nutserts 53 so as to fasten various kinds of brackets or the like from the vehicle body inner side. The molding member 49 may have portion formed to surround the insert brackets 55 and to be coupled to a roof rail or the like.

The molding member 49 is injection-molded while multiple insert nuts 57 are inserted, thereby forming a structure which can be easily fastened to another vehicle body component such as the lower vehicle body 15.

Figure 16:
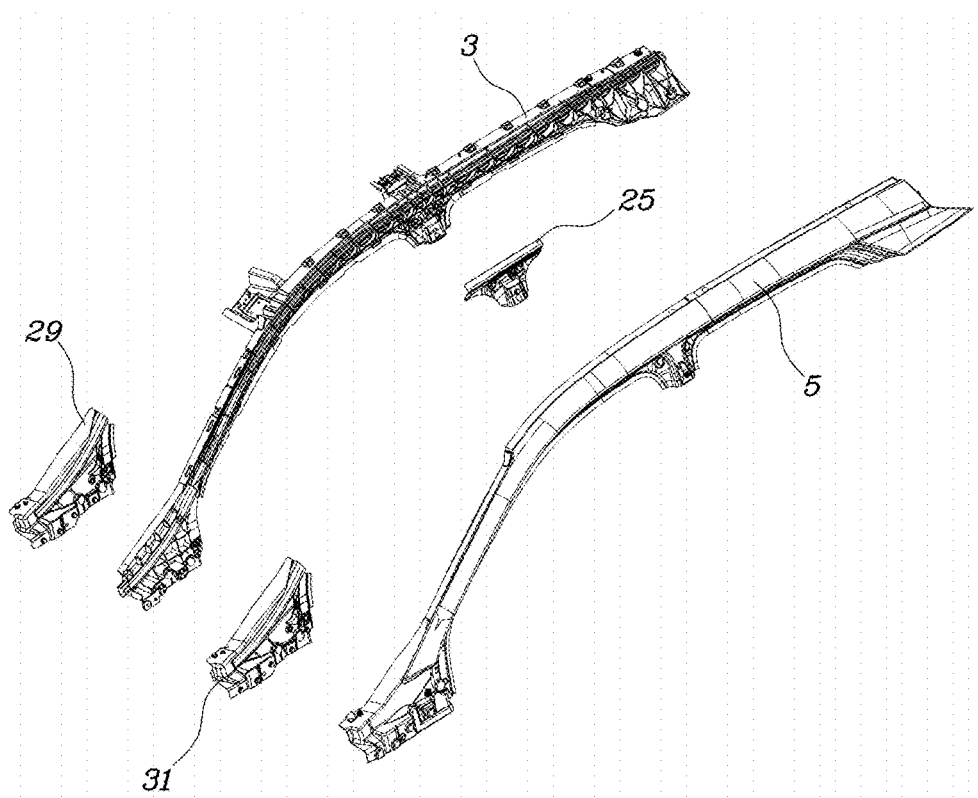
FIG. 16 is an exploded view of the upper body in FIG. 15.
Figure 17:
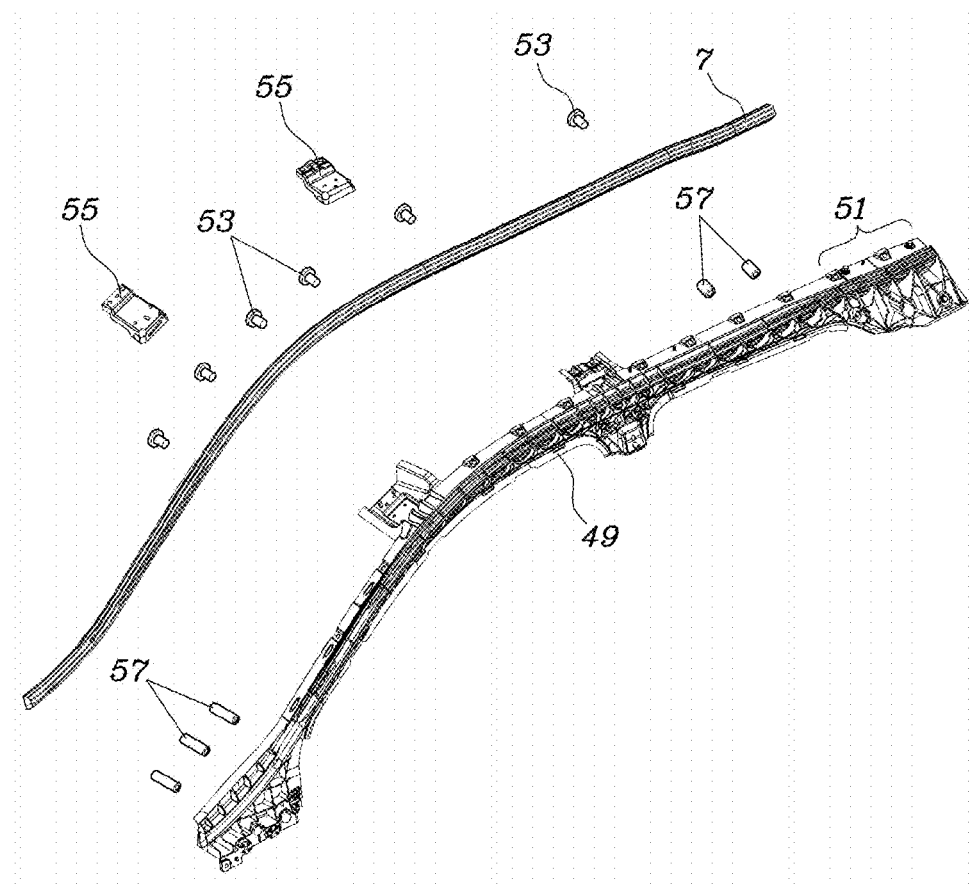
FIG. 17 is an exploded view of the roof side assembly in FIG. 16.
Figure 18:
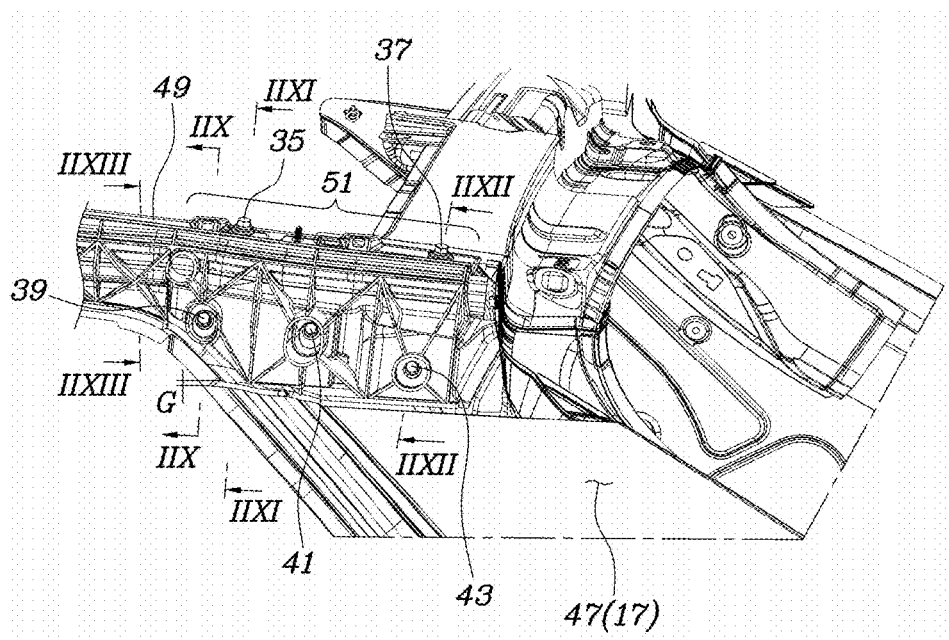
FIG. 18 is a detailed view of area XVIII in FIG. 14, in which the roof side assembly is coupled to the C-pillar of the lower vehicle body.

For reference, FIG. 16 illustrates an A-pillar mounting bracket 29 for coupling the roof side assembly 3 to the fender 27 of the lower vehicle body 15, together with a B-pillar mounting bracket 25 for coupling the roof side assembly 3 to the upper end of the B-pillar 16 of the lower vehicle body 15.

An A-pillar reinforcement member 31 is coupled between the vehicle body outer side of the roof side assembly 3 and the outer garnish 5, thereby securing sufficient rigidity of the front end of the upper vehicle body 18.

The C-pillar fastening portions 51 of the molding member 49 include multiple downward fastening portions configured to receive multiple downward fastening bolts penetrating the molding member 49 from the upper side of the vehicle body inner side with respect to the pipe 7 so as to be coupled to the lower vehicle body 15, and multiple lateral fastening portions configured to receive multiple lateral fastening bolts laterally penetrating the molding member 49 from the outside of the lower side with respect to the pipe 7 so as to be coupled to the lower vehicle body 15.

Figure 19:
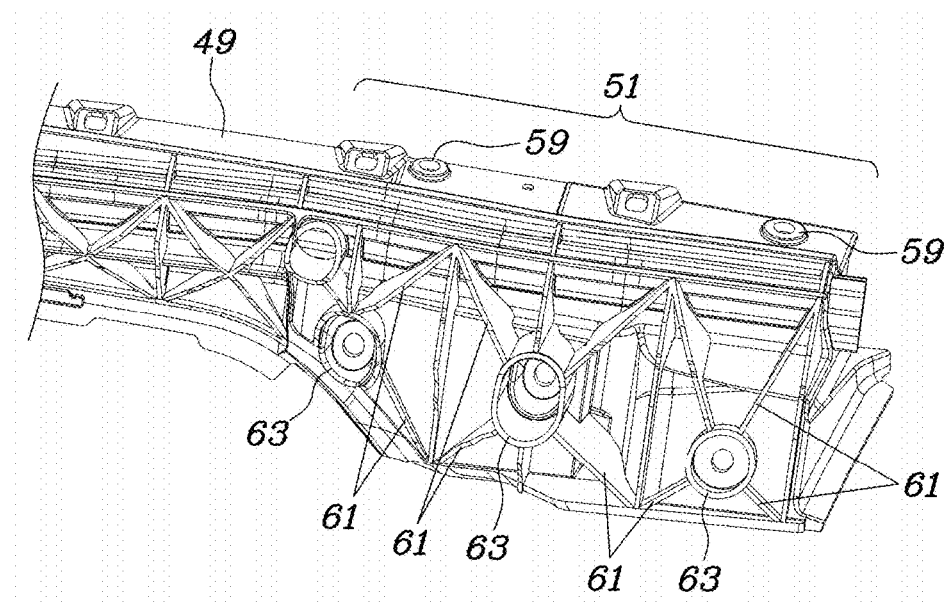
FIG. 19 is a view of FIG. 18, from which the lower vehicle body is deleted.

The multiple downward fastening portions include, as illustrated in FIG. 19, bolt head seats 59 protruding from the upper surface of the molding member 49 so as to support bolt heads of the downward fastening bolt.

The multiple lateral fastening portions include bolt receiving bosses 63 having spaces formed at the center thereof so as to receive the multiple lateral fastening bolts, and multiple reinforcement ribs 61 provided outside the bolt receiving bosses 63 so as to support the same.

Accordingly, the molding member 49, to which the downward fastening portions and the lateral fastening portions are fastened, have substantially increased local rigidity and more robust durability, thereby interconnecting the pipe 7 and the C-pillar 17 of the lower vehicle body 15 firmly.

In the present embodiment, the lateral fastening bolts include a first lateral fastening bolt 39, a second lateral fastening bolt 41, and a third lateral fastening bolt 43 disclosed successively from the front side of the vehicle body toward the rear side thereof, and the downward fastening bolts include a first downward fastening bolt 35 and a second downward fastening bolt 37 successively from the front side of the vehicle body toward the rear side thereof.

Therefore, the molding member 49 of the roof side assembly 3 and the C-pillar 17 of the lower vehicle body 15 are firmly coupled to each other stereoscopically by the five bolts, and such a bolting coupling structure can provide easy exchangeability and replaceability between the lower vehicle body 15 and the upper vehicle body 18, thereby providing a vehicle body structure appropriate for multi-type small-volume production.

Figure 20:
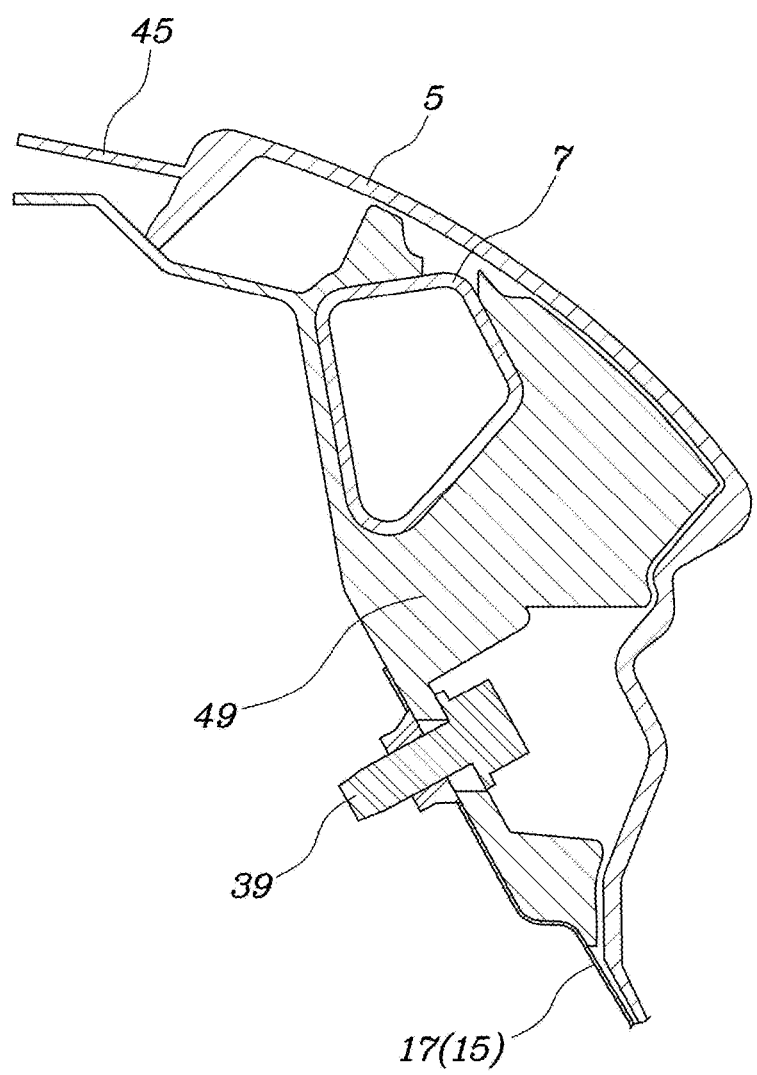
FIG. 20 is a sectional view taken along line IIX-IIX in FIG. 18.
Figure 21:
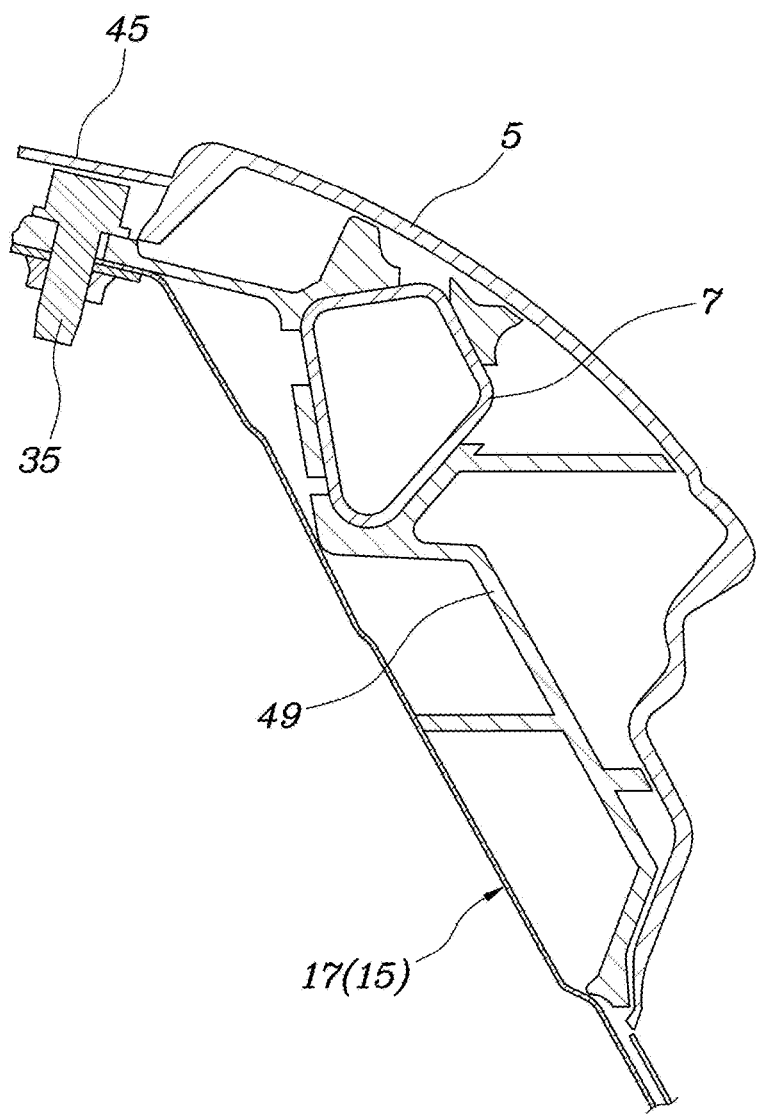
FIG. 21 is a sectional view taken along line IIXI-IIXI in FIG. 18.

Referring to sectional views of the outer garnish 5 in FIG. 20 and FIG. 21, the outer garnish 5 has a flange 45 formed to protrude from the vehicle body inner side and to cover the upper side of the downward fastening bolts such that the downward fastening bolts are not exposed to the outside, while preventing moisture inflow.

A roof panel or the like may be coupled to the flange so as to firmly implement the function for preventing moisture inflow.

The outer panel 47 of the C-pillar 17 of the lower vehicle body 15 has an upper end formed on the lower side of the molding member 49 so as to form a predetermined assembly gap G with the lower end of the molding member 49 such that the roof side assembly 3 can be laterally moved from a lateral side of the lower vehicle body 15 toward the lower vehicle body 15 and coupled thereto.

Figure 23:
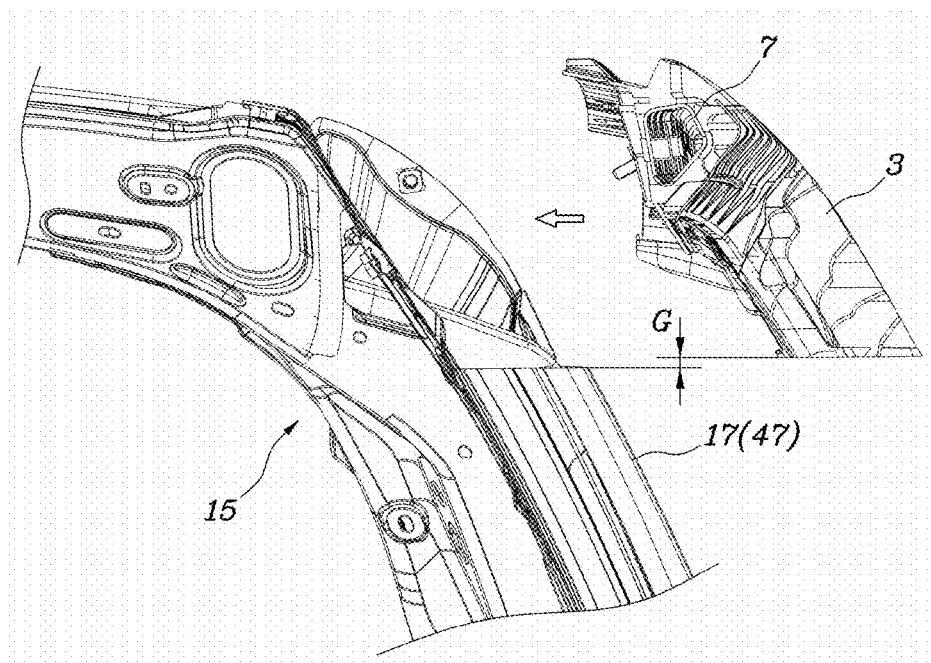
FIG. 23 is a sectional view taken along line IIXIII-IIXIII in FIG. 18, in which the roof side assembly is coupled to the lower vehicle body.

Accordingly, the roof side assembly 3 can be laterally moved from a lateral side of the lower vehicle body 15 so as to be assembled with the lower vehicle body 15 as illustrated in FIG. 23, thereby facilitating the vehicle body assembly process.

Figure 22:
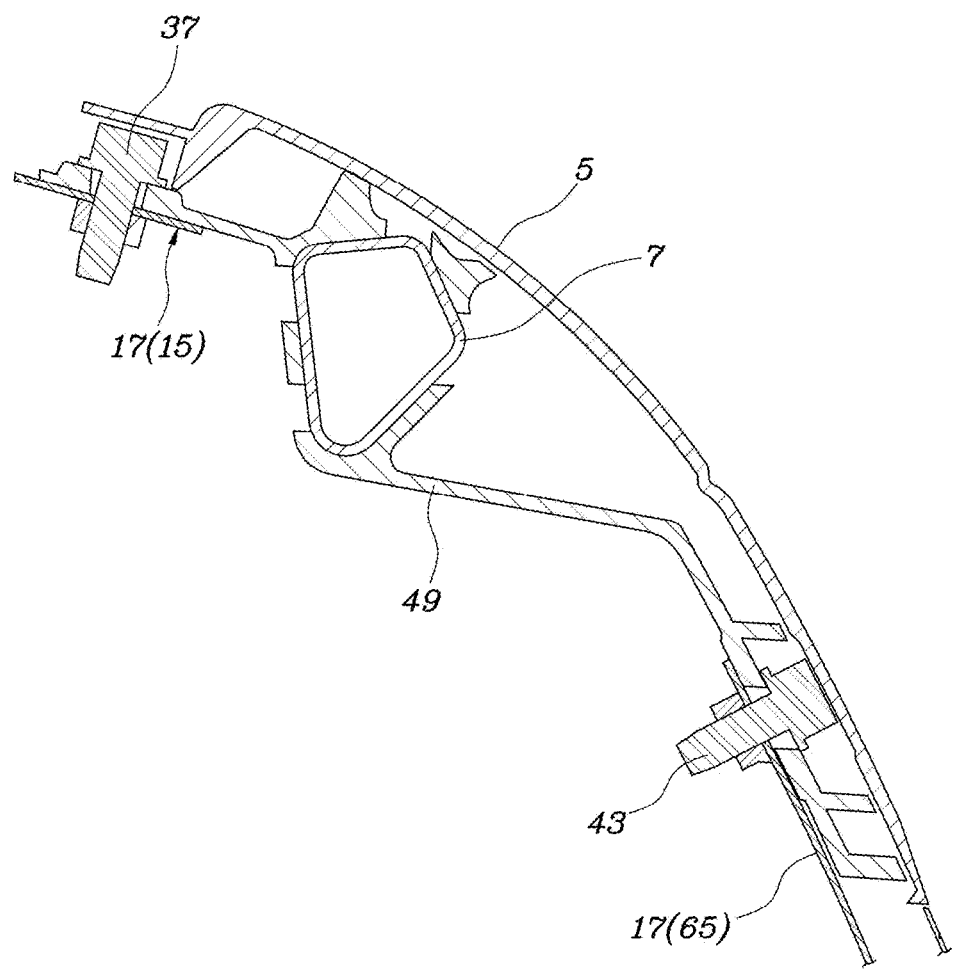
FIG. 22 is a sectional view taken along line IIXII-IIXII in FIG. 18.

The molding member 49 of the roof side assembly 3 is coupled to overlap the inner panel 65 of the C-pillar 17. At least one of the lateral fastening bolts are fastened in overlapping areas of the molding member 49 and the inner panel 65 of the C-pillar 17, thereby securing more robust assembly state (see FIG. 22).

Figure 24:
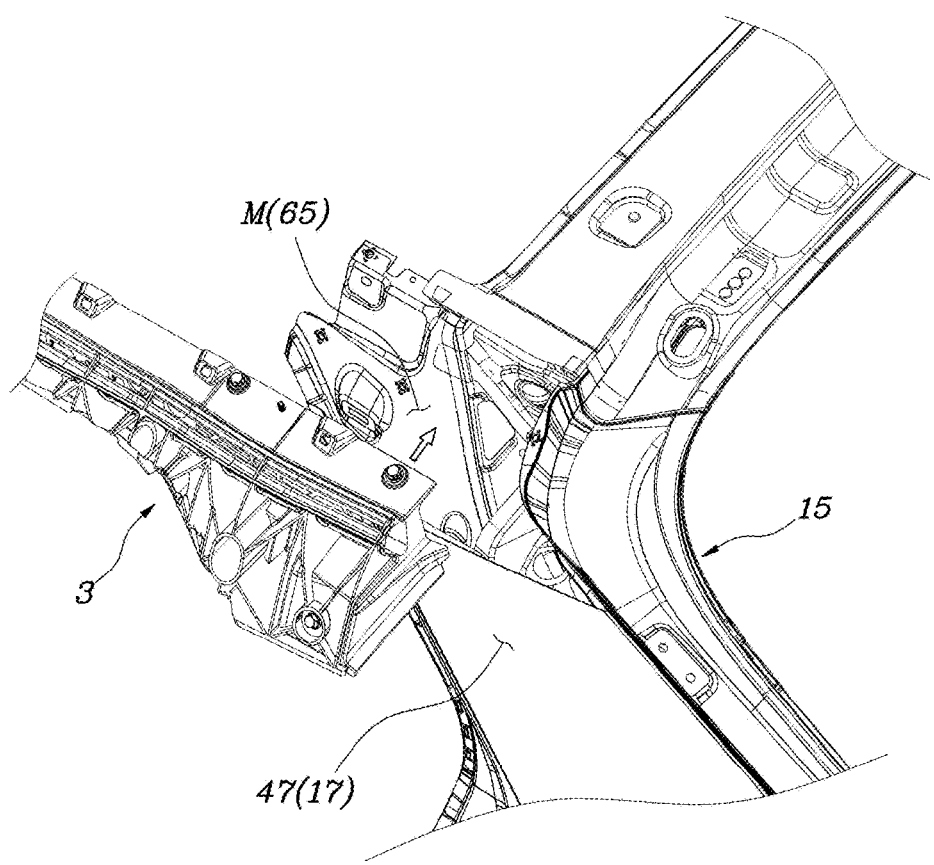
FIG. 24 illustrates the state in FIG. 23 from the viewpoint of FIG. 14.

For reference, FIG. 24 illustrates the overlapping portion M of the inner panel 65 of the C-pillar 17, which overlaps the molding member 49 of the roof side assembly 3.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. A vehicle body structure comprising:
a roof side assembly configured to connect upper ends of pillars of a vehicle body along the forward/backward direction of the vehicle body, the roof side assembly constituting an A-pillar of the vehicle body; and
an outer garnish coupled to an outer side of the roof side assembly,
wherein the roof side assembly comprises:
a pipe having a closed cross-section shape and elongated in the forward/backward direction of the vehicle body so as to form a closed section;
an upper reinforcement member coupled to an upper side of the pipe and elongated in the forward/backward direction of the vehicle body;
a lower reinforcement member coupled to a lower side of the pipe and elongated in the forward/backward direction of the vehicle body; and
an inner reinforcement member coupled to a vehicle body inner side of the pipe and elongated in the forward/backward direction of the vehicle body, and
wherein at least one C-pillar mounting bracket is disposed on a rear side of the roof side assembly so as to fix the pipe to an upper end of a C-pillar of a lower vehicle body.

2. The vehicle body structure of claim 1, wherein the C-pillar mounting bracket comprises:
a main bracket coupled to the upper end of the C-pillar of the lower vehicle body while supporting the vehicle body inner side and the lower side of the pipe; and
a sub-bracket coupled to the main bracket while surrounding a vehicle body outer side of the pipe.

3. The vehicle body structure of claim 2, wherein the main bracket has a recess curved along a lower contour of the pipe such that inner and lower surfaces of the pipe are seated in the recess.

4. The vehicle body structure of claim 3, wherein the sub-bracket has a plate shape such that the lower side thereof is coupled to the main bracket while surrounding an outer surface of the pipe seated in the recess of the main bracket.

5. The vehicle body structure of claim 3, wherein the roof side assembly is coupled to the C-pillar of the lower vehicle body by:
multiple downward fastening bolts penetrating the upper reinforcement member from an upper side with respect to the pipe so as to be coupled to the lower vehicle body; and
multiple lateral fastening bolts laterally penetrating the lower reinforcement member from outside of a lower side with respect to the pipe so as to be coupled to the lower vehicle body.

6. The vehicle body structure of claim 5, wherein at least one of the downward fastening bolts successively penetrates the upper reinforcement member and one of the main bracket or the inner reinforcement member so as to be fastened to the lower vehicle body, and
at least one of the lateral fastening bolts penetrates the main bracket or the lower reinforcement member from the outside of the lower side with respect to the pipe so as to be coupled to the lower vehicle body.

7. The vehicle body structure of claim 6, wherein the multiple downward fastening bolts comprise:
a first downward fastening bolt successively penetrating the upper reinforcement member and the main bracket so as to be fastened to the lower vehicle body; and
a second downward fastening bolt successively penetrating the upper reinforcement member and the inner reinforcement member so as to be fastened to the lower vehicle body.

8. The vehicle body structure of claim 7, wherein the multiple lateral fastening bolts comprise:
a first lateral fastening bolt penetrating the main bracket so as to be fastened to the lower vehicle body; and
a second lateral fastening bolt and a third lateral fastening bolt penetrating the lower reinforcement member so as to be fastened to the lower vehicle body.

9. The vehicle body structure of claim 5, wherein the outer garnish has a flange arranged to protrude toward the vehicle body inner side and to cover upper sides of the downward fastening bolts such that the downward fastening bolts are not exposed to the outside, while preventing moisture inflow.

10. The vehicle body structure of claim 2, wherein the main bracket is shaped to cover a parting line on the upper end of the C-pillar of the lower vehicle body.

11. The vehicle body structure of claim 2, wherein an outer panel of the C-pillar of the lower vehicle body has an upper end arranged on a lower side of the main bracket such that the roof side assembly, to which the main bracket and the sub-bracket are coupled, can be moved laterally from a lateral side of the lower vehicle body toward the lower vehicle body to be coupled thereto.

12. A vehicle body structure comprising:
a roof side assembly configured to connect upper ends of pillars of a vehicle body along the forward/backward direction of the vehicle body, the roof side assembly constituting an A-pillar of the vehicle body; and
an outer garnish coupled to an outer side of the roof side assembly,
wherein the roof side assembly comprises:
a pipe having a closed cross-section shape and elongated in the forward/backward direction of the vehicle body so as to form a closed section; and
a molding member injection-molded while the pipe is inserted therein, and
wherein multiple C-pillar fastening portions are provided on a rear side of the molding member so as to couple the roof side assembly to an upper end of a C-pillar of a lower vehicle body.

13. The vehicle body structure of claim 12, wherein the C-pillar fastening portions of the molding member comprise:
multiple downward fastening portions configured to receive multiple downward fastening bolts penetrating the molding member from an upper side with respect to the pipe so as to be coupled to the lower vehicle body; and
multiple lateral fastening portions configured to receive multiple lateral fastening bolts laterally penetrating the molding member from outside of a lower side with respect to the pipe so as to be coupled to the lower vehicle body.

14. The vehicle body structure of claim 13, wherein the multiple downward fastening portions comprise bolt head seats protruding from an upper surface of the molding member so as to support bolt heads of the downward fastening bolts.

15. The vehicle body structure of claim 13, wherein the lateral fastening portions comprise bolt receiving bosses having spaces disposed at a center thereof so as to receive the lateral fastening bolts, and multiple reinforcement ribs support the bolt receiving bosses having spaces from the outside.

16. The vehicle body structure of claim 13, wherein the lateral fastening bolts comprise a first lateral fastening bolt, a second lateral fastening bolt, and a third lateral fastening bolt successively disposed from a front side of the vehicle body toward a rear side thereof, and
the downward fastening bolts comprise a first downward fastening bolt and a second downward fastening bolt successively disposed from the front side of the vehicle body toward the rear side thereof.

17. The vehicle body structure of claim 13, wherein the outer garnish has a flange arranged to protrude toward the vehicle body inner side and to cover upper sides of the downward fastening bolts such that the downward fastening bolts are not exposed to the outside, while preventing moisture inflow.

18. The vehicle body structure of claim 13, wherein an outer panel of the C-pillar of the lower vehicle body has an upper end arranged on a lower side of the molding member so as to form a predetermined assembly gap with a lower end of the molding member such that the roof side assembly can be moved laterally from a lateral side of the lower vehicle body toward the lower vehicle body to be coupled thereto.

19. The vehicle body structure of claim 13, wherein the molding member of the roof side assembly is coupled so as to overlap an inner panel of the C-pillar, and at least one of the lateral fastening bolts is fastened in areas in which the molding member and the inner panel of the C-pillar overlap.

* * * * *